April 25, 1961 R. B. JOHNSON 2,981,673
NUCLEAR FUEL ASSEMBLY LOCKING JOINT AND METHOD
Filed Oct. 22, 1958
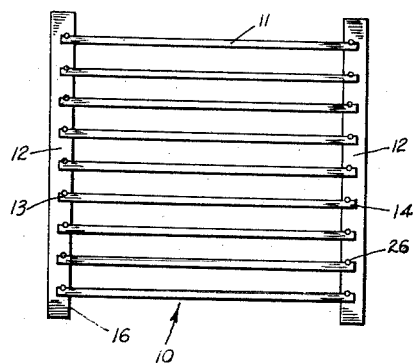
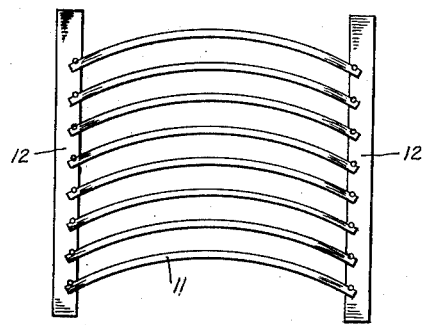
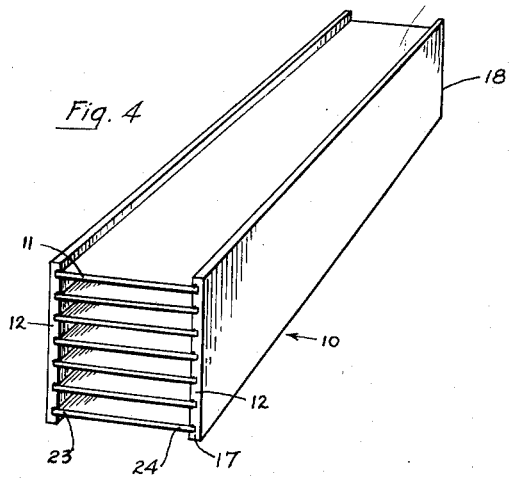
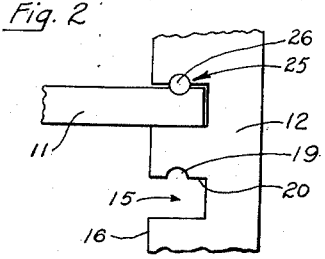
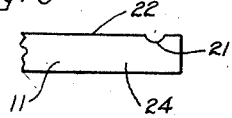
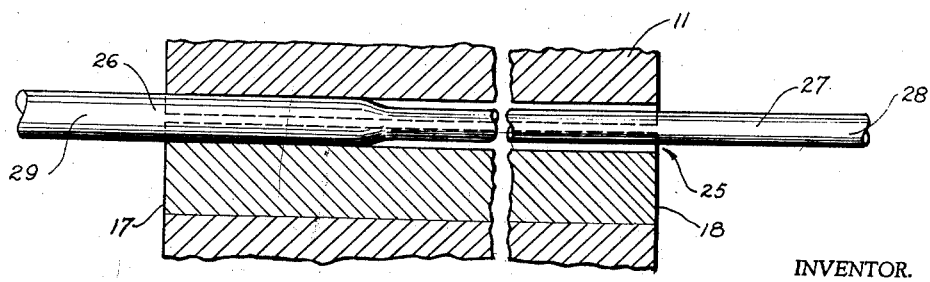
INVENTOR.
RALPH B. JOHNSON
BY
ATTORNEYS

United States Patent Office 2,981,673
Patented Apr. 25, 1961

2,981,673

NUCLEAR FUEL ASSEMBLY LOCKING JOINT AND METHOD

Ralph B. Johnson, Huntington, N.Y., assignor to Sylvania-Corning Nuclear Corporation, a corporation of Delaware Filed Oct. 22, 1958, Ser. No. 768,901

18 Claims. (Cl. 204—193.2)

This invention relates to a nuclear reactor plate-type fuel assembly and more particularly to a mechanical locking means and method for affixing the fuel plates to the side supporting members in such an assembly.

Neutronic reactor fuel assemblies of the plate-type are generally provided with elongated fuel plates held in spaced overlying relationship relative to one another by supporting members at their edges. The fuel plates contain an inside layer of fissionable material such as uranium and are surrounded by a layer of protective material such as, for example, aluminum. The fuel plates may be flat or curved but are generally rectangular when observed in a plan view. The plates are usually much longer than they are wide and are relatively thin. The sides of the fuel plates are held between side supporting members, and such sides may be either perpendicular or angled relative to the supporting members. The fuel assemblies are separate units which are made independently and subsequently mounted within the reactor during its construction, One of the major problems confronting the nuclear reactor art is the need for a satisfactory device and method for attaching the fissionable fuel plates to the side supporting members or mounting plates. In the past, attachment has been accomplished by a brazing operation which has many disadvantages.

The brazing method anneals the fuel plate elements at the location of the braze which softens the fuel plates to such a degree that they frequently become twisted or deformed out of their original aligned shape and position. Furthermore, brazing of the fuel plates to the supporting members along their joining surfaces frequently produces a seam having internal, hidden voids in the weld which not only disrupt the uniform predictable strength characteristic of the joint but also may contain entrapped flux materials having corrosive and other undesirable properties. Such fluxes may contain, for example, lithium, which in some forms acts as a moderator and thus may seriously affect or even destroy the chain reaction propensities of the fuel assembly.

The brazing of the fuel plates to the side supporting members requires high temperatures which may cause warpage of the plate elements, and in some instances this warpage may be so great that the elements must be removed and salvaged, if possible, or destroyed. Once an element has been damaged, the combination of warpage and annealing usually does not permit convenient salvage of the other fuel plates of the assembly.

And finally, the brazing method is costly and time consuming. It not only involves substantial preparation of the metal surfaces prior to brazing but it is a slow mechanical process. It also requires large treating furnaces in which the brazing operation is carried out. All of these factors add substantially to the eventual cost of the fuel assembly elements.

It is an object of the present invention to provide a mechanical locking means for, and method of, attaching the fuel plates to the side supporting members which is quick, simple and economical, and may be carried out at room temperature.

Another object is to provide a method of attachment which eliminates undesirable voids at the joint, provides a joint having considerable strength and ruggedness, and at the same time provides an assembly from which the fuel plates may be easily salvaged if so desired.

An additional object is to provide a method of attachment which is particularly adaptable for assembly of ceramic and other nonmetallic fuel elements.

Briefly, the principles of the present invention are directed to a neutronic reactor fuel assembly having a plurality of elongated rectangular fuel plates containing fissionable material disposed in spaced overlying relation to one another. Rectangular side supporting members are disposed along opposed side edges of the fuel plates and have a plurality of matching rectangular parallel channels extending along facing surfaces thereof from end to end corresponding to the number of fuel plates in the assembly. Each of the channels has a longitudinal groove, semi-circular in cross-section, along at least one lateral face thereof and extending from end to end of said channel. Each fuel plate has corresponding longitudinal grooves semi-circular in cross-section along each of its side edge portions.

The edge portions of the fuel plates are disposed within respective matching channels in the side of supporting members. The grooves of the plates and the channels register with one another to define longitudinal passages through the asembly and pre-tensioned wires extend through and fill said pasages and exert a radially outward pressure against the grooves whereby the fuel plates and the side supporting members are held in tight interlocked relation without voids along their joined portions.

Other objects and features will become apparent in the following description and claims, and in the drawings, in which:

Fig. 1 is an end elevation of a fuel assembly embodying the present invention;

Fig. 2 is an enlarged fragmentary end elevation of the locking means of Fig. 1;

Fig. 3 is an enlarged end elevation of one edge portion of a fuel plate;

Fig. 4 is a perspective view of fuel assembly;

Fig. 5 is an end elevation of a curved plate fuel assembly; and

Fig. 6 is a fragmentary longitudinal section of a locking means according to the present invention.

Referring to the drawings, one embodiment of a fuel assembly utilizing the principles of the present invention is shown in Figs. 1 and 4 and designated generally by the reference numeral 10. It is comprised of a plurality of elongated flat rectangular fuel plates 11 containing fissionable material held in spaced overlying relation by rectangular side supporting members 12 along the opposed side edges 13, 14 of the fuel plates 11. The side supporting members 12 have a plurality of matching rectangular parallel channels 15 extending along their opposed or facing inner surfaces 16 from one end 17 to the other end 18 (see also Fig. 2).

Each of the channels 15 has a longitudinal groove 19 semi-circular in cross-section along the upper lateral face 20 as shown in Fig. 2. The groove 19 extends from end to end of the channel. Similarly, each fuel plate 11 has a corresponding semi-circular groove 21 in its upper surface 22 along its side edge portions 23, 24 (see also Fig. 3).

The side edge portions 23, 24 of each fuel plate 11 are disposed within a respective matching pair of channels 15 in the side supporting members 12, and the grooves 19 of the channels register with thte grooves 21 of the plate to define a longitudinal passage or keyway 25 through the assembly (see Fig. 6). Extending through each such passage 25 is a cylindrical rod, bar or wire 26 which completely fills the passageway and effects mechanical locking of the fuel plate edge to the side supporting member.

The method of manufacturing the above type assembly is as follows. The fuel plates 11 and side supporting members 12 are manufactured in the usual manner and the upper lateral faces 20 of the channels 15 are grooved by any conventional technique such as broaching or the like. The grooves 21 in the fuel plates 11 are formed in the same manner. The side supporting members 12 are held in a vertical position with their respective channels 15 facing one another and they are held in such position by any suitable device such as a chuck or similar arrangement. Then the fuel plates 11 are inserted into the respective grooves to provide the general arrangement shown in Fig. 4, the lead end portions 27 of wires or rods 26, being formed with a smaller diameter than that of the longitudinal passages 25, are threaded through the passages from one end 17, and extend from and beyond the other end 18 of the assembly. The wires are then pulled through the passages 25 until the larger diameter portions 29 of the wires 26 fill the circular passages, thus forming a locking key. Since the normal diameter of the wire is greater than the diameter of the passage 25, the wire is drawn or stressed axially as it is pulled into the passage, to make the diameter small enough so that the wire can be passed through. After the larger diameter portion 29 of the wire 26 fills the passage 25, the exposed ends of the wire are cut off and the wire then retracts slightly axially and consequently exerts radial outward pressure against the grooves 19, 21 providing greater locking strength for the joint.

In an alternative method the lead end 28 of the wire 26 is fastened at the lead end 18 of the groove 21 in the fuel plate 11 and the wire laid along the groove. Then the fuel plate is pushed into the channel from one end of the side supporting member. In this manner the wire is stretched and stressed during the insertion step and then when the fuel plate is fully inserted in the channel the remaining exposed portion of the wire is cut away, effecting the same end result as the previous method.

It is of course obvious that other cross-sectional shaped grooves can be used if desired with corresponding cross-sectional configurations of the wire or key being provided. It is also possible to make the joint by a combined heating and cooling operation, e.g. heating the assembly while cooling the wire, although the previously described method provides a simpler means of accomplishing the desired result in most instances.

This invention can be used in joining metallic fuel assemblies wherein the metal is usually aluminum or the like, but it also may be used for the manufacture of ceramic or other non-metallic fuel assemblies, and the locking key may be of wire or non-metallic material as desired.

The present invention thus provides a locking joint which eliminates the undesirable features encountered in a brazing operation. Unpredictable voids in the joints are now eliminated and a joint is obtained having uniform strength characteristics. Furthermore, the fuel plates may easily be salvaged from the fuel assembly by merely machining away the outer surface of each side supporting member, leaving the fuel plates in their original undamaged condition for further use. Furthermore, the need for expensive apparatus such as welding equipment, etc., is eliminated.

The present invention can be used for locking the fuel plates to the supporting members in practically any type of fuel assembly, whether the fuel plates are flat as shown in Fig. 1, laterally curved as shown in Fig. 5, or of the well-known concentric cylindrical type (not shown) or any other type.

While one embodiment of the invention has been shown and described it is to be understood that certain changes and additions may be made by those skilled in the art without departing from the scope and spirit of the invention.

I claim:

1. A nuclear reactor fuel assembly comprising a fuel plate containing fissionable material, a supporting member having a channel along one of its surfaces, said channel having a groove along one of its faces, said fuel plate having a corresponding groove, a portion of said fuel plate disposed within said channel with said grooves in registration to define a passage, and stressed locking means disposed in said passage for exerting pressure against said grooves to maintain said fuel plate and said supporting member in tightly interlocked relation without voids.

2. A nuclear reactor fuel assembly comprising an elongated fuel plate containing fissionable material, a side supporting member having an elongated channel along the entire length of one of its surfaces, said channel having a groove along one of its faces, said fuel plate having a corresponding groove along one edge portion, said edge portion disposed within said channel with said grooves in registration to define a passage, and stressed cylindrical locking means disposed in said passage for exerting radially outward pressure against said grooves to maintain said fuel plate and said supporting member in tightly interlocked relation without voids.

3. A nuclear reactor fuel assembly comprising an elongated fuel plate containing fissionable material, an elongated side supporting member having an elongated channel along the entire length of one of its surfaces, said channel having a groove along the entire length of one of its faces, said fuel plate having a corresponding groove along one edge portion, said edge portion disposed within said channel with said grooves in registration to define a passage, and a wire completely filling said passage exerting radially outward pressure against said grooves whereby said fuel plate and said supporting member are held in tightly interlocked relation without voids.

4. A nuclear reactor fuel assembly comprising an elongated fuel plate containing fissionable material, an elongated side supporting member having an elongated channel along the entire length of one of its surfaces, said channel having a groove semi-circular in cross-section along the entire length of one of its faces, said fuel plate having a corresponding groove along one edge portion, said edge portion disposed within said channel with said grooves in registration to define a passage, and a pretensioned wire in said passage exerting radially outward pressure against said grooves whereby said fuel plate and said supporting member are held in tightly interlocked relation without voids.

5. A nuclear reactor fuel assembly comprising a flat elongated fuel plate containing fissionable material, an elongated side supporting member having an elongated channel along the entire length of one of its surfaces, said channel having a groove semi-circular in cross-section along the entire length of one of its faces, said fuel plate having a corresponding groove along one edge portion, said edge portion disposed within said channel with said grooves in registration to define a passage, and a pre-tensioned wire in said passage exerting radially outward pressure against said grooves whereby said fuel plate and said supporting member are held in tightly interlocked relation without voids.

6. A nuclear reactor fuel assembly comprising a plurality of elongated fuel plates containing fissionable material disposed in spaced overlying relation to one another, side supporting members along opposed side edges of said plate having a plurality of channels extending along opposed surfaces thereof, each of said channels having a groove along a lateral face thereof, each fuel plate having corresponding grooves along opposed side edge portions, said edge portions disposed within respective channels in said side supporting members with the grooves of said plates and of said channels in register defining longitudinal passages through said assembly, stressed locking means filling said passages and exerting pressure against said grooves, whereby said fuel plates and said side supporting members are held in tight interlocked relation without voids along their joined portions.

7. A nuclear reactor fuel assembly comprising a plurality of elongated fuel plates containing fissionable material disposed in spaced overlying relation to one another, side supporting members along opposed side edges of said plates having a plurality of matching channels extending along opposed surfaces thereof corresponding to the number of fuel plates in the assembly, each of said channels having a longitudinal groove along a lateral face thereof, each fuel plate having corresponding grooves along opposed side edge portions, said edge portions disposed within respective matching channels in said side supporting members with the grooves of said plates and of said channels in register defining longitudinal passages through said assembly, stressed locking means filling said passages and exerting pressure against said grooves, whereby said fuel plates and said side supporting members are held in tight interlocked relation without voids along their joined portions.

8. A nuclear reactor fuel assembly comprising a plurality of elongated fuel plates containing fissionable material disposed in spaced overlying relation to one another, side supporting members along opposed side edges of said plates having a plurality of matching parallel channels extending along opposed surfaces thereof from end to end corresponding to the number of fuel plates in the assembly, each of said channels having a longitudinal groove along a lateral face from end to end thereof, each fuel plate having corresponding grooves along opposed side edge portions, said edge portions disposed within respective matching channels in said side supporting members with the grooves of said plates and of said channels in register defining longitudinal passages through said assembly, stressed locking means filling said passages and exerting pressure against said grooves, whereby said fuel plates and said side supporting members are held in tight interlocked relation without voids along their joined portions.

9. A nuclear reactor fuel assembly comprising a plurality of elongated rectangular fuel plates containing fissionable material disposed in spaced overlying relation to one another, rectangular side supporting members along opposed side edges of said plates having a plurality of matching rectangular parallel channels extending along opposed surfaces thereof from end to end corresponding to the number of fuel plates in the assembly, each of said channels having a longitudinal groove semi-circular in cross-section along at least one lateral face from end to end thereof, each fuel plate having corresponding grooves along opposed side edge portions, said edge portions disposed within respective matching channels in said side supporting members with the grooves of said plates and of said channels in register defining longitudinal passages through said assembly, pre-tensioned wires filling said passages and exerting a radially outward pressure against said grooves, whereby said fuel plates and said side supporting members are held in tight interlocked relation without voids along their joined portions.

10. A method for the manufacture of a plate-type nuclear reactor fuel assembly comprising the steps of forming a plurality of fuel plates containing fissionable material, forming a plurality of side supporting members, forming a plurality of parallel channels along the length of one surface of each member, forming a groove along a lateral face of each channel and along opposed side edge portions of each fuel plate, placing pairs of said members in spaced facing relation with their respective channels in alignment to receive said plates, inserting the opposed edges of said plates in respective channels and registering the matching grooves of said edge portions with those of said channels to provide longitudinal passages through said assembly, inserting locking means within said passages to lock the fuel plates and side supporting members tightly together without voids.

11. A method for the manufacture of a plate-type nuclear reactor fuel assembly comprising the steps of forming a plurality of fuel plates containing fissionable material, forming a plurality of side supporting members, forming a plurality of parallel rectangular channels along the length of one surface of each member, forming a groove semi-circular in cross-section along at least one lateral face of each channel and along opposed side edge portions of each fuel plate, placing pairs of said members in spaced facing relation with their respective channels in alignment to receive said plates, inserting the opposed edges of said plates in respective channels and registering the matching grooves of the said edge portions with those of said channels to provide longitudinal passages through said assembly, pulling extended wires through said passages under tension, removing the tension and cutting off the exposed ends of the wires at the ends of the passages.

12. A method for the manufacture of a plate-type nuclear reactor fuel assembly comprising the steps of forming a plurality of fuel plates containing fissionable material, forming a plurality of side supporting members, forming a plurality of parallel rectangular channels along the length of one surface of each member, forming a groove semi-circular in cross-section along at least one lateral face of each channel and along opposed side edge portions of each fuel plate, placing pairs of said members in spaced facing relation with their respective channels in alignment to receive said plates, inserting the opposed edges of said plates in respective channels and registering the matching grooves of the said edge portions with those of said channels to provide longitudinal passages through said assembly, pulling extended wires through said passages under tension, removing the tension and permitting the wires to retract to a more relaxed condition and cutting off the exposed ends of the wires at the ends of the passages.

13. A method of manufacturing a plate-type nuclear reactor fuel assembly comprising the steps of forming a fuel plate containing fissionable material, forming a side supporting member, forming a longitudinal channel in said member from end to end thereof dimensioned to receive the edge of said fuel plate, making a groove along a lateral face of said channel, similarly grooving an edge portion of said fuel plate, inserting the edge of said fuel plate into said channel, registering the grooves in said edge portion and said channel to form a passage through said assembly, drawing a tensioned locking means through said passage, and removing the tension.

14. A method of manufacturing a plate-type nuclear reactor fuel assembly comprising the steps of forming a fuel plate containing fissionable material, forming a side supporting member, forming a longitudinal channel in said member from end to end thereof dimensioned to receive the edge of said fuel plate, making a groove along at least one lateral face of said channel, similarly grooving an edge portion of said fuel plate, inserting the edge of said fuel plate into said channel, registering the grooves in said edge portion and said channel to form a passage through said assembly, drawing a tensioned wire through said passage, and removing the tension and cutting off the exposed ends of said wire, thereby locking said fuel plate and said member together without voids.

15. A method of manufacturing a plate-type nuclear reactor fuel assembly comprising the steps of forming a rectangular fuel plate containing fissionable material, forming a rectangular side supporting member, forming a rectangular longitudinal channel in said member from end to end thereof dimensioned to receive the edge of said fuel plate, making a groove semi-circular in cross-section along at least one lateral face of said channel, similarly grooving an edge portion of said fuel plate, inserting the edge of said fuel plate into said channel, registering the grooves in said edge portion and said channel to form a passage through said assembly, drawing a tensioned wire through said passage, and removing the tension and cutting off the exposed ends of said wire, thereby locking said fuel plate and said member together without voids.

16. A method for the manufacture of a plate-type nuclear reactor fuel assembly comprising the steps of forming a plurality of fuel plates containing fissionable material, forming a plurality of side supporting members, forming a plurality of parallel rectangular channels along the length of one surface of each member, forming a groove semi-circular in cross-section along at least one lateral face of each channel and along opposed side edge portions of each fuel plate, placing pairs of said members in spaced facing relation with their respective channels in alignment to receive said plates, fastening a wire at the lead end of each groove of said fuel plates and laying the wire along the groove, then inserting the opposed edges of the lead ends of the fuel plates in the ends of respective channels while maintaining the matching grooves of the edge portions and of the channels in register, forcing said plates along said channels to draw said wire and match the corresponding ends of said plates and said members, and cutting off the exposed ends of said wires.

17. A method of manufacturing a plate-type nuclear reactor fuel assembly comprising the steps of forming a fuel plate containing fissionable material, forming a side supporting member, making a longitudinal channel in said member from end to end thereof dimensioned to receive the edge of said fuel plate, making a groove along a lateral face of said channel, similarly grooving an edge portion of said fuel plate, fastening a wire at the lead end of the groove in said fuel plate and laying the wire along the groove, then inserting the edge of the lead end of the fuel plate in the lead end of said channel, matching said grooves to form a passage, forcing said plate along said channel to draw said wire until the ends of said plate and said member meet.

18. A method of manufacturing a plate-type nuclear reactor fuel assembly comprising the steps of forming a fuel plate containing fissionable material, forming a side supporting member, making a longitudinal channel in said member from end to end thereof dimensioned to receive the edge of said fuel plate, making a groove semi-circular in cross-section along at least one lateral face of said channel, similarly grooving an edge portion of said fuel plate, fastening a wire at the lead end of each groove in said fuel plate and laying the wire along each groove, then inserting the edge of the lead end of the fuel plate in the lead end of said channel, matching said grooves to form a passage, forcing said plate along said channel to draw said wire until the ends of said plate and said member meet, and cutting off the exposed ends of said wire.

References Cited in the file of this patent

UNITED STATES PATENTS

| | | |
|---|---|---|
| 883,489 | Schossow | Mar. 31, 1908 |
| 1,212,262 | Rockwell | Jan. 16, 1917 |
| 1,865,808 | Abegg | July 5, 1932 |
| 2,831,806 | Wigner | Apr. 22, 1958 |